Oct. 20, 1925.
A. EICHELBERGER
1,557,675
LUBRICATING SYSTEM
Original Filed Oct. 29, 1921
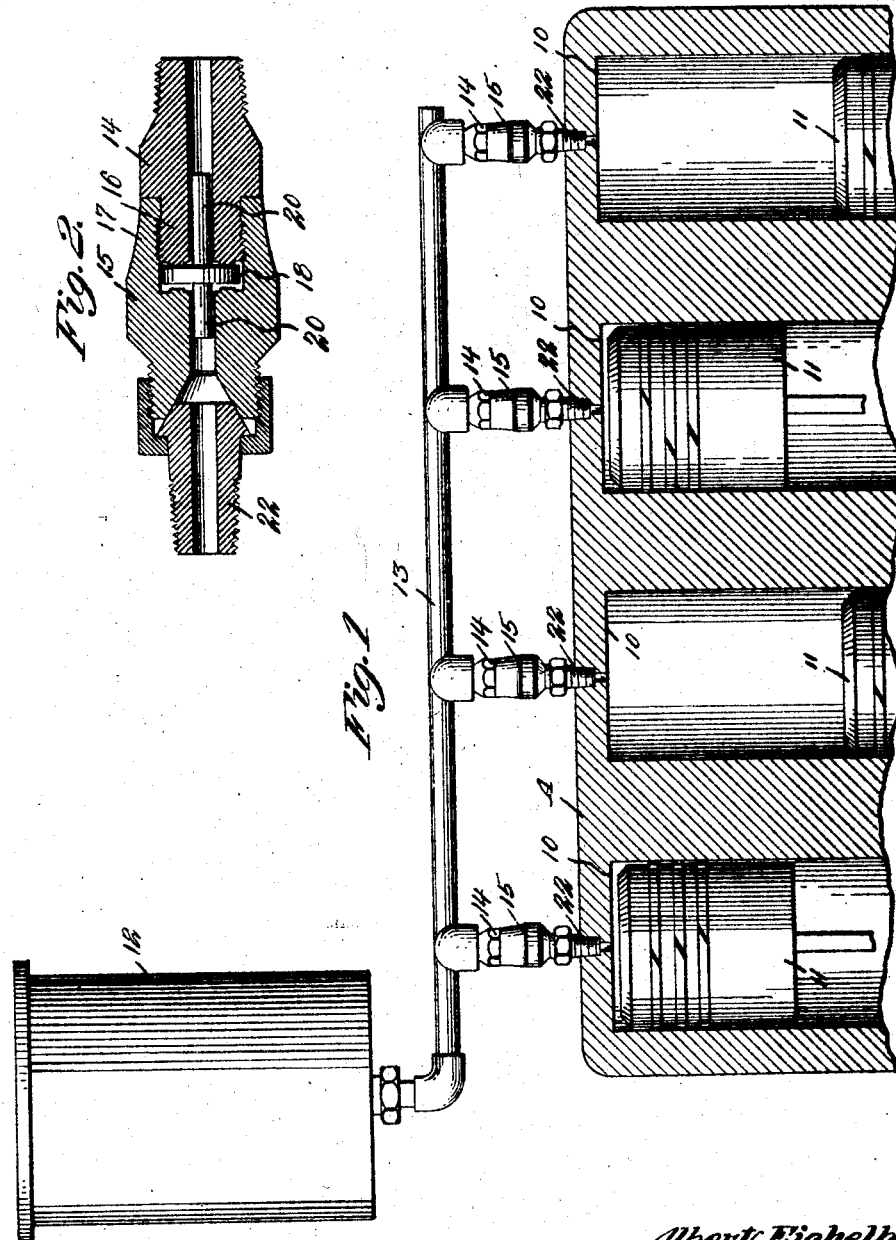
Albert Eichelberger
INVENTOR
BY Victor J. Evans
ATTORNEY Patented Oct. 20, 1925.

1,557,675

UNITED STATES PATENT OFFICE.

ALBERT EICHELBERGER, OF DE SOTO, MISSOURI.

LUBRICATING SYSTEM.

Application filed October 29, 1921, Serial No. 511,361. Renewed August 6, 1925.

*To all whom it may concern:*

Be it known that I, ALBERT EICHELBERGER, a citizen of the United States, residing at De Soto, in the county of Jefferson and State of Missouri, have invented new and useful Improvements in Lubricating Systems, of which the following is a specification.

This invention relates to internal combustion engines, and more particularly to means for lubricating the cylinders and packing rings for the pistons.

The principal object of the invention resides in providing a lubricant container which communicates with each of the cylinders of the motor, the communication being controlled by automatically operating valves which are controlled by the compression and suction strokes of the piston, so as to allow a predetermined quantity of oil or lubricant to enter the cylinder at predetermined intervals.

The nature and advantages of the invention will be better understood when the following detailed description is read in connection with the accompanying drawing, the invention residing in the construction combination, and arrangement of parts as claimed.

In the drawing forming part of this application, like numerals of reference indicate similar parts in the several views, and wherein:

Figure 1—is a fragmentary view of a motor showing the lubricating device associated therewith.

Figure 2—is a vertical sectional view through one of the valves controlling the communication between the lubricating container and the motor.

Referring to the drawing in detail, A indicates a portion of an internal combustion engine, wherein 10 represents the cylinders, in each of which operates a piston 11.

In accordance with the present invention, I provide a lubricant container 12 from the bottom of which extends a pipe 13, the pipe extending across the top of the motor A, and having valves communicating with the respective cylinders of the motor as shown in Figure 1. Depending from the pipe 13 toward each cylinder, is a two part valve casing, the respective parts of each casing being indicated at 14 and 15 respectively as shown in Figure 2. These parts of the valve casing are fitted one within the other, the part 14 having a reduced threaded extension 16 which is threaded into a socket like portion 17 of the part 15. The confronting faces of these parts constitute a valve seat for the disk valve 18, the latter being provided with a stem 20 which projects above and below the disk valve as shown. A portion of this stem is slidably fitted in the part 14 of the valve casing, and the other portion of the stem is slidably fitted in the part 15 of the valve casing. Depending from the valve casing proper is a threaded nipple 22 which is threaded into the motor as shown in Figure 1.

The valve is automatic in action. On the suction stroke of each piston, the valve 18 is moved away from its upper seat, thereby allowing a small quantity of lubricant to pass around the valve stem 20 and also around the valve 18 to the space beneath the valve, from where it passes through the cylinder. On the compression stroke, the valve is forced upwardly to cut off the supply of oil from the supply pipe 13, the alternating movement of the valve incident to the suction and compression strokes, maintaining a certain quantity of oil in the lowermost space beneath the valve for the purpose of supplying the cylinder with oil which lubricates all parts of the cylinders and packing rings where the lubricant is required, yet not leaving a surplus of oil in the cylinder for carbonization.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:

The combination with an internal combustion engine including a cylinder provided with a port, of a lubricating system comprising a container, a valve casing, a valve in said casing, and a conduit connecting said casing and said container, said casing having a recess therein, a pair of oppositely disposed valve seats in said recess and a bore communicating with said recess and connecting said conduit and said port, said valve having a stem and an enlarged part loosely disposed in said bore and said recess respectively, and said enlarged part being forced into engagement with said seats alternately by the operation of said engine to control the flow of lubricant thereto from said container.

In testimony whereof I affix my signature.

ALBERT EICHELBERGER.